(12) United States Patent
Kim

(10) Patent No.: US 11,567,218 B2
(45) Date of Patent: Jan. 31, 2023

(54) GPS FILTER-SETTING METHOD, AND SERVER USING THE SAME

(71) Applicant: Yanadoo Corp, Seoul (KR)

(72) Inventor: Min Young Kim, Seoul (KR)

(73) Assignee: YANADOO CORP, Seoul (KR)

( * ) Notice: Subject to any disclaimer, the term of this patent is extended or adjusted under 35 U.S.C. 154(b) by 0 days.

(21) Appl. No.: 17/181,623

(22) Filed: Feb. 22, 2021

(65) Prior Publication Data

US 2021/0263163 A1 Aug. 26, 2021

(30) Foreign Application Priority Data

Feb. 26, 2020 (KR) ........................ 10-2020-0023743

(51) Int. Cl.
*G01S 19/40* (2010.01)
*G01S 19/07* (2010.01)
*G01S 19/42* (2010.01)
*G01S 19/22* (2010.01)

(52) U.S. Cl.
CPC .............. *G01S 19/40* (2013.01); *G01S 19/07* (2013.01); *G01S 19/22* (2013.01); *G01S 19/42* (2013.01); *G01S 19/428* (2013.01)

(58) Field of Classification Search
CPC .......... G01S 19/40; G01S 19/07; G01S 19/42; G01S 19/428; G01S 19/22
USPC ............. 342/357.23, 357.25, 357.61, 357.44
See application file for complete search history.

(56) References Cited

U.S. PATENT DOCUMENTS

| | | | |
|---|---|---|---|
| 7,095,370 B1* | 8/2006 | van Diggelen | G01S 19/22 342/357.61 |
| 10,809,388 B1* | 10/2020 | Carcanague | G01S 19/22 |
| 2020/0348422 A1* | 11/2020 | Carcanague | G01S 19/49 |
| 2021/0109228 A1* | 4/2021 | Rautalin | G01S 19/27 |
| 2021/0132236 A1* | 5/2021 | Cookman | G01S 19/24 |
| 2021/0173091 A1* | 6/2021 | Lennen | G01S 19/30 |
| 2021/0239848 A1* | 8/2021 | Karvounis | G01S 19/243 |
| 2021/0262824 A1* | 8/2021 | Kim | G01C 21/3804 |

FOREIGN PATENT DOCUMENTS

| | | | | |
|---|---|---|---|---|
| CA | 2792902 A1 * | 4/2013 | | G01S 19/11 |
| KR | 2003-0023872 A | 3/2003 | | |
| KR | 10-2007-0070714 A | 7/2007 | | |
| WO | WO-2005008273 A1 * | 1/2005 | | G01S 19/05 |

OTHER PUBLICATIONS

Notice of Opinion Submission dated Feb. 18, 2021 from the Korean Intellectual Property Office in KR Application No. 10-2020-0023743.

* cited by examiner

*Primary Examiner* — Chuong P Nguyen
(74) *Attorney, Agent, or Firm* — Sughrue Mion, PLLC

(57) ABSTRACT

A GPS filter-setting method comprises collecting, by a GPS filter-setting server, terminal information of a user terminal and GPS signal receiving environment information, setting, by the GPS filter-setting server, a filtering parameter used to filter an invalid GPS signal in the user terminal based on the collected terminal information of the user terminal and the GPS signal receiving environment information and transmitting, by the GPS filter-setting server, the set filtering parameter to the user terminal.

8 Claims, 4 Drawing Sheets

FIG. 4

<FILTERING PARAMETER MAPPING TABLE>

| TERMINAL INFORMATION | | GPS SIGNAL RECEIVING ENVIRONMENT INFORMATION | | FILTER PARAMETER |
|---|---|---|---|---|
| MODEL INFORMATION | OS INFORMATION | WEATHER ENVIRONMENT | PHYSICAL OBSTACLE ENVIRONMENT | |
| MD#1 | OS#1 | WT#1 | PHY#1 | 1 |
| MD#1 | OS#1 | WT#1 | PHY#2 | 2 |
| MD#2 | OS#1 | WT#1 | PHY#1 | 4 |
| ⋮ | ⋮ | ⋮ | ⋮ | |

<USER INFORMATION>

| | | | | | |
|---|---|---|---|---|---|
| <CASE#1> | MD#2 | OS#1 | WT#1 | PHY#1 | 4 |
| <CASE#2> | MD#2 | OS#1 | WT#1 | PHY#2 | 8 |

GPS FILTER-SETTING METHOD, AND SERVER USING THE SAME

CROSS-REFERENCE TO RELATED APPLICATIONS

This application claims the benefits of Korean Patent Applications No. 10-2020-0023743, filed on Feb. 26, 2020, in the Korean Intellectual Property Office, the disclosures of which are incorporated herein in their entireties by reference.

BACKGROUND

1. Field

The disclosure relates to a GPS filter-setting method, and a server using the same, and more particularly, to a method of setting a filtering parameter used to filter an invalid GPS signal in a user terminal based on terminal information of a user terminal and GPS signal receiving environment information, and a server using the filtering parameter.

2. Description of the Related Art

A global positioning system (GPS) receiver receives signals transmitted from three or more GPS satellites and uses the received signals for triangulation to calculate a position.

The GPS signal may include a noise signal due to various environmental factors, and an error may occur in a positioning process due to the noise signal.

The GPS receiver includes a hardware filter for removing such an error, while position data received and processed by the GPS receiver may be filtered by software in a user terminal including the GPS receiver.

SUMMARY

Provided are a method of setting a filtering parameter used to filter an invalid GPS signal in a user terminal based on terminal information of a user terminal and GPS signal receiving environment information, and a server using the filtering parameter.

According to an aspect of an embodiment, a GPS filter-setting method may comprise collecting, by a GPS filter-setting server, terminal information of a user terminal and GPS signal receiving environment information, setting, by the GPS filter-setting server, a filtering parameter used to filter an invalid GPS signal in the user terminal based on the collected terminal information of the user terminal and the GPS signal receiving environment information and transmitting, by the GPS filter-setting server, the set filtering parameter to the user terminal.

According to an aspect of an embodiment, terminal information of the user terminal may comprise at least one of model information of the user terminal, a type of an operating system (OS) being used by the user terminal, and a version of the OS.

According to an aspect of an embodiment, the GPS signal receiving environment information may comprise first receiving environment information according to a physical obstacle environment around the user terminal and second receiving environment information according to a weather environment in an area where the user terminal is located.

According to an aspect of an embodiment, the filtering parameter may comprise a parameter related to a filtering range when the user terminal filters the invalid GPS signal by software.

According to an aspect of an embodiment, the setting of the filtering parameter may comprise selecting a pre-stored filtering parameter value, which is mapped to the terminal information of the user terminal and the GPS signal receiving environment information, and setting the filtering parameter to a selected value.

According to an aspect of an embodiment, the setting of the filtering parameter to a selected value may comprise when there is no pre-stored filtering parameter value which is mapped to the terminal information of the user terminal and the GPS signal receiving environment information, newly generating a new filtering parameter value corresponding to the terminal information of the user terminal and the GPS signal receiving environment information based on a relationship with a pre-stored filtering parameter and the terminal information of the user terminal and the GPS signal receiving environment information mapped to the pre-stored filtering parameter and setting the filtering parameter used to filter the invalid GPS signal in the user terminal to the new filtering parameter value.

According to an aspect of an embodiment, The GPS filter-setting method may further comprise adjusting, by the GPS filter-setting server, a setting period of the filtering parameter based on a position change rate of the user terminal.

According to an aspect of an embodiment, the setting of the filtering parameter may comprise setting the filtering parameter based on the collected terminal information of the user terminal and the GPS signal receiving environment information, and a movement type of the user terminal.

According to an aspect of an embodiment, a GPS filter-setting server may comprise a data collection processor configured to collect terminal information of a user terminal and GPS signal receiving environment information, a filtering parameter setter configured to set a filtering parameter used to filter an invalid GPS signal in the user terminal based on the collected terminal information of the user terminal and the GPS signal receiving environment information and a communication interface configured to transmit the set filtering parameter to the user terminal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a view illustrating an example of a mapping table used when a GPS filter is set according to the GPS filter-setting method of FIG. 3.

DETAILED DESCRIPTION

Figure 1:
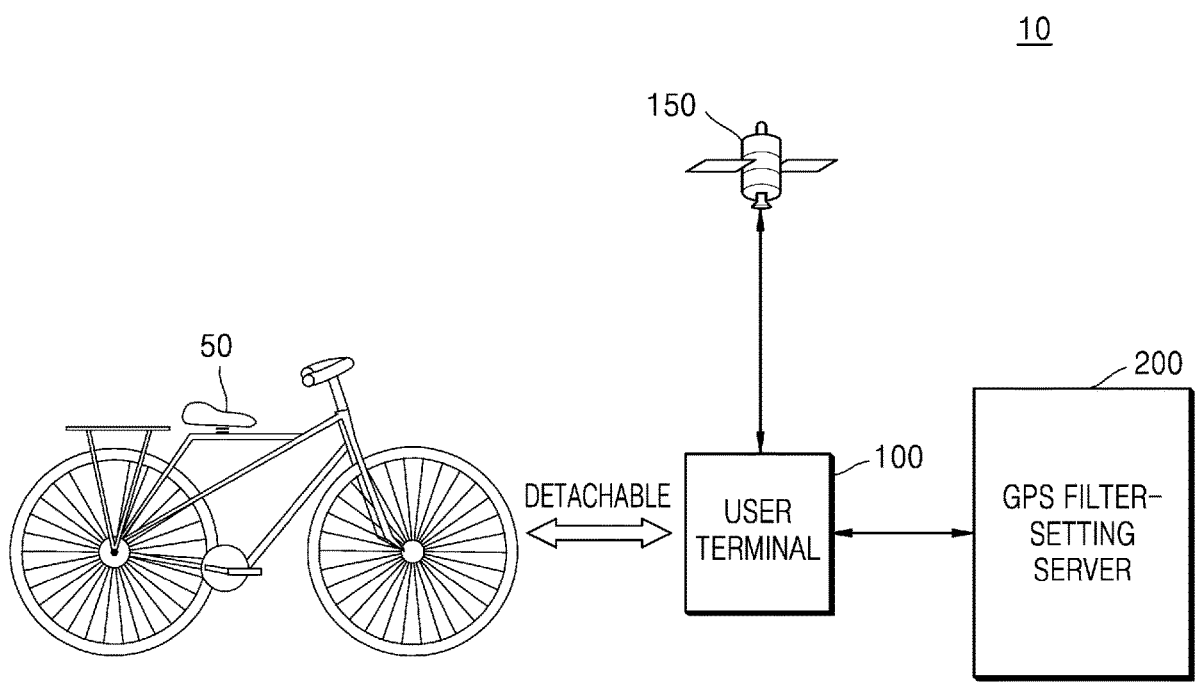
FIG. 1 is a conceptual diagram of a GPS filter-setting system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a GPS filter-setting system according to an embodiment.

Referring to FIG. 1, a GPS filter-setting system 10 may include a user terminal 100 and a GPS filter-setting server 200.

The location of the user terminal 100 may be moved while a user directly possesses the user terminal 100 or may be moved while being mounted on a moving member 50, according to various types of activities (i.e., movement types) of the user.

In FIG. 1, a case in which a user carrying the user terminal 100 moves using a bicycle, which is an example of transportation 50, is illustrated as an example. However, depending on the embodiment, the user may move using various types of activities (movement types), such as walking, trekking, running, bicycle riding, or personal mobility device.

According to an embodiment, the user terminal 100 may be implemented as various types of wireless communication devices capable of wireless communication (e.g., a smartphone, a tablet PC, or a separate device to provide path information management service, etc.).

The user terminal 100 may position its own location.

The user terminal 100 may include a GPS module (not shown) for receiving and processing a GPS signal from at least one satellite 150, and may position the user terminal 100 by using the received GPS signal.

In FIG. 1, only one satellite 150 is illustrated for convenience of description, but the technical scope of the disclosure is not limited by the number of satellites 150.

According to an embodiment, the user terminal 100 may perform positioning through various methods (e.g., using a Bluetooth beacon) other than a GPS method. In this case, a GPS signal filtering process according to an embodiment may be applied in the same manner to a filtering process for other positioning signals (e.g., Bluetooth signals).

The GPS filter-setting server 200 may collect terminal information of the user terminal 100 and GPS signal receiving environment information from the user terminal 100.

According to an embodiment, the GPS filter-setting server 200 may receive location information (or GPS signal) from the user terminal 100 and collect GPS signal receiving environment information directly online by using the received location information.

According to an embodiment, the terminal information of the user terminal 100 may include at least one of model information of the user terminal 100, an operating system (OS) type used by the user terminal 100, and a version of the OS.

According to an embodiment, the GPS signal receiving environment information may include at least one of first receiving environment information according to a physical obstacle environment around the user terminal 100 and second receiving environment information according to a weather environment in an area where the user terminal 100 is located.

According to an embodiment, the first receiving environment information may indicate the degree of existence of a building or structure that is an obstacle to the reception of GPS signals around the user terminal 100, and may be expressed as a number, but is not limited thereto.

According to an embodiment, the second receiving environment information may include information about a current weather condition of an area where the user terminal 100 is located, such as weather, temperature, or humidity.

The GPS filter-setting server 200 may set a filtering parameter used to filter an invalid GPS signal in the user terminal 100 by using the collected terminal information of the user terminal 100 and GPS signal receiving environment information.

According to an embodiment, the filtering parameter may include a parameter related to a filtering range when filtering an invalid signal in the user terminal 100 by software.

For example, the filtering parameter may set a filtering range for filtering an invalid positioning signal by using at least one of a distance between a current positioning value and previous positioning values and an angle between the previous positioning values and the current positioning value.

For example, the filtering parameter may include at least one parameter of the number of satellites, vertical accuracy, and horizontal accuracy, which are a reference for filtering GPS signals.

According to an embodiment, the GPS filter-setting server 200 may set a filtering parameter used to filter an invalid GPS signal in the user terminal 100 by using the collected terminal information of the user terminal 100, GPS signal receiving environment information, and the movement type of the user terminal 100.

The GPS filter-setting server 200 may transmit the set filtering parameter to the user terminal 100.

According to an embodiment, the process of collecting the terminal information of the user terminal 100 and the GPS signal receiving environment information and setting the filtering parameter of the user terminal 100 by the GPS filter-setting server 200 may be performed periodically according to a preset period. For example, the preset period may be adjusted according to a position change rate of the user terminal 100. In this case, the preset period may be shorter as the position change rate of the user terminal 100 increases.

According to another embodiment, the process of collecting the terminal information of the user terminal 100 and the GPS signal receiving environment information and setting the filtering parameter of the user terminal 100 by the GPS filter-setting server 200 may be performed according to a request of the user terminal 100.

According to another embodiment, the process of collecting the terminal information of the user terminal 100 and the GPS signal receiving environment information and setting the filtering parameter of the user terminal 100 by the GPS filter-setting server 200 may be performed when a change in an area to which the user terminal 100 belongs is detected.

The detailed configuration and operation of the GPS filter-setting server 200 will be described later with reference to FIG. 2.

Figure 2:
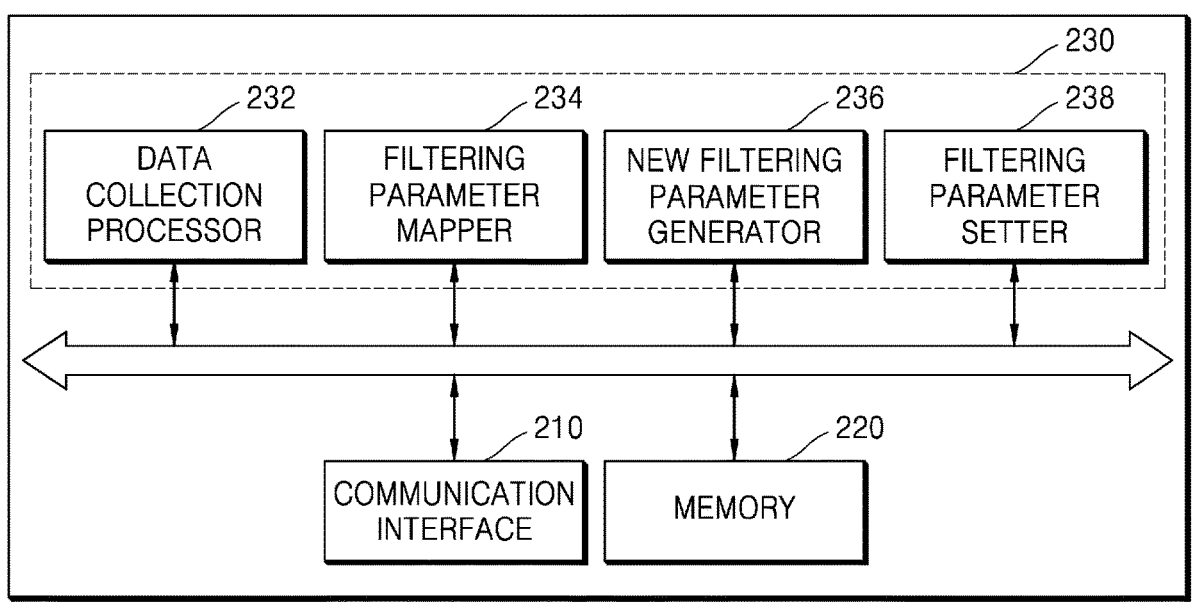
FIG. 2 is a block diagram of a GPS filter-setting server shown in FIG. 1, according to an embodiment.

FIG. 2 is a block diagram of the GPS filter-setting server 200 shown in FIG. 1, according to an embodiment.

Referring to FIGS. 1 and 2, the GPS filter-setting server 200 may include a communication interface 210, a memory 220, and a processor 230.

The communication interface 210 may interface communication between the GSP filter-setting server 200 and the user terminal 100, and may process data or signals transmitted/received during the interfacing process.

The memory 220 may store data required to provide a GPS filter-setting service of the GPS filter-setting server 200 (e.g., a filtering parameter mapping table), data required during processing of the processor 230, and data generated during or after processing of the processor 230.

According to an embodiment, different filtering parameter mapping tables for each movement type (e.g., walking, trekking, running, bicycle riding, or personal mobility device, etc.) may be stored in the memory 220 and managed separately.

According to an embodiment, the memory 220 may store a program for performing a GPS filter-setting method according to an embodiment, and may be combined with the processor 230 to execute the program.

The processor 230 may include a data collection processor 232, a filtering parameter mapper 234, a new filtering parameter generator 236, and a filtering parameter setter 238.

The data collection processor 232 may collect terminal information of the user terminal 100 and GPS signal receiving environment information from the user terminal 100.

According to an embodiment, the data collection processor 232 may preprocess the terminal information of the user terminal 100 and the GPS signal receiving environment information collected from the user terminal 100 in a form that may be processed by the processor 230.

According to an embodiment, the data collection processor 232 may receive location information (or GPS signal) from the user terminal 100 and collect GPS signal receiving environment information directly online by using the received location information.

The filtering parameter mapper 234 may map the terminal information of the user terminal 100 and the GPS signal receiving environment information collected or processed by the data collection processor 232 with the filtering parameter mapping table stored in the memory 220, and may select and output the mapped filtering parameter.

According to an embodiment, the filtering parameter mapping table may be stored in a form in which filtering parameters are mapped according to terminal information and GPS signal receiving environment information.

According to an embodiment, the filtering parameter mapping table may be stored in the memory 220 in the form of a lookup table.

An example of the filtering parameter mapping table will be described later with reference to FIGS. 3 and 4.

The new filtering parameter generator 236, according to a mapping result of the filtering parameter mapper 234, may generate a new filtering parameter value using a pre-stored mapping table when there is no pre-stored filtering parameter mapped to terminal information of a user terminal and GPS signal receiving environment information.

A process of generating a new filtering parameter value by the new filtering parameter generator 236 will be described later with reference to FIGS. 3 and 4.

The filtering parameter setter 238 may set a filtering parameter of the user terminal 100 with a filtering parameter value mapped by the filtering parameter mapper 234 or a new filtering parameter value generated by the new filtering parameter generator 236.

The filtering parameter set by the filtering parameter setter 238 may be transmitted to the user terminal 100 through the communication interface 210.

Figure 3:
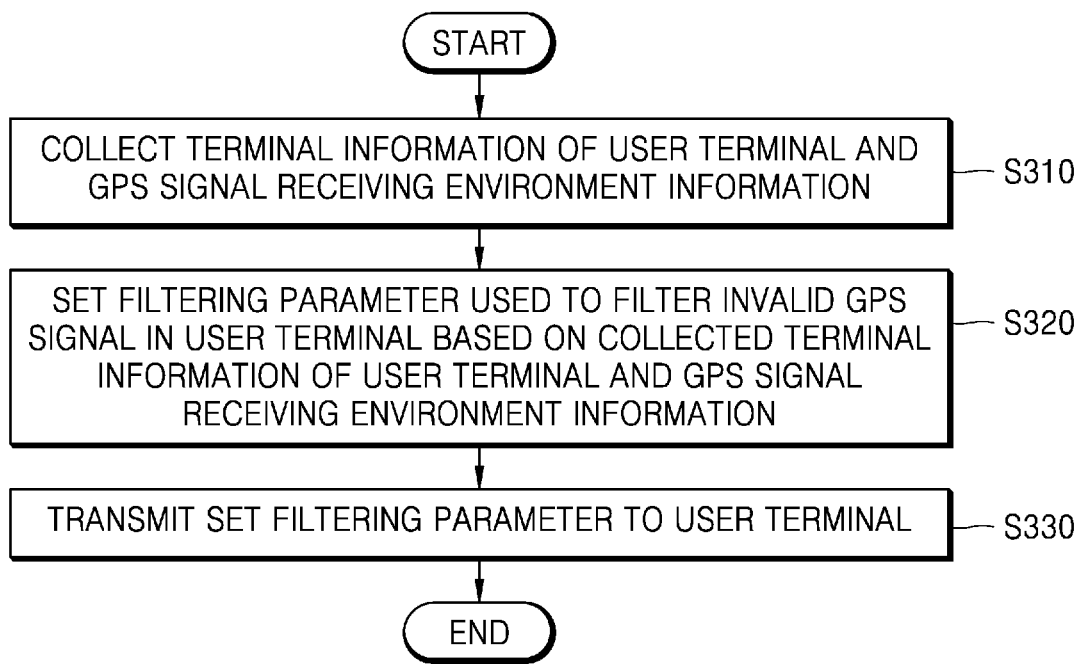
FIG. 3 is a flowchart illustrating a GPS filter-setting method according to an embodiment.

FIG. 3 is a flowchart illustrating a GPS filter-setting method according to an embodiment, and FIG. 4 is a view illustrating an example of a mapping table used when a GPS filter is set according to the GPS filter-setting method of FIG. 3.

Referring to FIGS. 3 and 4, in operation S310, the GPS filter-setting server 200 may collect terminal information of the user terminal 100 and GPS signal receiving environment information.

According to an embodiment, the GPS filter-setting server 200 may perform a process of building a filtering parameter mapping table before operation S310. In this case, the GPS filter-setting server 200 may receive information about an optimal filtering parameter corresponding to the terminal information and the GPS signal receiving environment information when the number of GPS signals collected per hour after filtering from the user terminal 100 is equal to or greater than a reference number. The GPS filter-setting server 200 may generate a filtering parameter mapping table by mapping and storing the received optimal filtering parameter to the terminal information and the GPS signal receiving environment information.

According to an embodiment, the user terminal 100 may preferentially adjust a condition for the number of satellites until the number of GPS signals collected per hour is equal to or greater than the reference number, and may adjust conditions for vertical and horizontal accuracy when the number of GPS signals collected per hour is less than the reference number even by adjusting the condition for the number of satellites.

In operation S320, the GPS filter-setting server 200 may set a filtering parameter used to filter an invalid GPS signal in the user terminal 100 based on the collected terminal information of the user terminal 100 and the GPS receiving environment information.

According to an embodiment, the GPS filter-setting server 200, by using the filtering parameter mapping table stored in the memory 220, may select a pre-stored filtering parameter value mapped to the collected terminal information of the user terminal 100 and the GPS receiving environment information and set a filtering parameter of the user terminal 100 to a selected value.

Referring to FIG. 4 together, the filtering parameter mapping table may map and store filtering parameter values according to terminal information (e.g., including model information of the user terminal 100 and OS information in use) and GPS signal receiving environment information (e.g., including weather environment information and physical obstacle environment information of an area where the user terminal 100 is located).

According to an embodiment, as the model of the user terminal 100 is the latest model, a low-power GPS module is applied, so that a relatively large number of noise signals are included in a GPS signal, and in this case, a relatively large number of GPS signals may be filtered by a hardware filter. Accordingly, as the model of the user terminal 100 is the latest model, a filtering parameter value used to filter GPS signals by software may be set relatively less strictly (i.e., set a wide range of filtering criteria).

According to an embodiment, as the GPS signal receiving environment is poor (e.g., in rainy weather), a relatively large number of noise signals are included in a GPS signal, and in this case, a relatively large number of GPS signals may be filtered by a hardware filter. Accordingly, as the GPS signal receiving environment is poor, a filtering parameter value used to filter GPS signals by software may be set relatively less strictly (i.e., set a wide range of filtering criteria).

According to an embodiment, because the manufacturer of the user terminal 100 is different or the user terminal 100 has different GPS signal filtering characteristics according to the type and version of the OS, a filtering parameter value suitable for this may be set.

For example, when model information is MD#2 and OS information is OS#1 in the terminal information of the user terminal 100, and when a weather environment is WT#1 and a physical obstacle environment is PHY#1 in the GPS signal receiving environment information (CASE#1), they may be mapped to a third row of the filtering parameter mapping table. In this case, the filtering parameter of the user terminal 100 may be set to '4', which is a corresponding filtering parameter value.

According to an embodiment, when there is no pre-stored filtering parameter value mapped to the terminal information of the user terminal 100 and the GPS signal receiving environment information, the GPS filter-setting server 200 may newly generate a new filtering parameter value corresponding to the terminal information of the user terminal 100 and the GPS signal receiving environment information based on a relationship with a pre-stored filtering parameter and the terminal information of the user terminal and the GPS signal receiving environment information mapped to the pre-stored filtering parameter For example, when model information is MD#2 and OS information is OS#1 in the terminal information of the user terminal 100, and when a weather environment is WT#1 and a physical obstacle environment is PHY#2 in the GPS signal receiving environment information (CASE#2), they may be mapped to the filtering parameter mapping table, and there may be no pre-stored filtering parameter value. In this case, the GPS filter-setting server 200, using a relationship that a filtering parameter value doubles from '1' to '2' when only the physical obstacle environment is changed from PHY#1 to PHY#2 in first and second rows of the filtering parameter mapping table, may newly generate a filtering parameter value of '8', which is twice as much as '4', for the terminal information of the user terminal 100 and the GPS signal receiving environment information in which only the physical obstacle environment has changed from PHY#1 to PHY#2 compared to a third row. Accordingly, the GPS filter-setting server 200 may set the filtering parameter of the user terminal 100 to a new filter parameter value '8'.

According to an embodiment, when a new filter parameter is generated, the GPS filter-setting server 200 may receive feedback on whether the number of GPS signals collected per hour after filtering according to the new filter parameter in the user terminal 100 is equal to or greater than a reference number, and may adjust a new filter parameter value.

Returning to FIG. 3, in operation S330, the GPS filter-setting server 200 may transmit the set filter parameter to the user terminal 100.

According to an embodiment, the user terminal 100 may receive the filtering parameter transmitted from the GPS filter-setting server 200, and may set a filter implemented by software through an application using the filtering parameter received from the user terminal 100.

Methods and devices according to an embodiment may provide location information optimized for a GPS signal receiving environment and an environment of a user terminal processing a GPS signal by setting a filtering parameter used to filter an invalid GPS signal in the user terminal based on terminal information of the user terminal and GPS signal receiving environment information.

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

What is claimed is:

1. A GPS filter-setting method comprising:
   collecting, by a GPS filter-setting server, terminal information of a user terminal and GPS signal receiving environment information;
   setting, by the GPS filter-setting server, a filtering parameter used to filter an invalid GPS signal in the user terminal based on the collected terminal information of the user terminal and the GPS signal receiving environment information; and
   transmitting, by the GPS filter-setting server, the set filtering parameter to the user terminal,
   wherein the setting of the filtering parameter includes selecting a pre-stored filtering parameter value, which is mapped to the terminal information of the user terminal and the GPS signal receiving environment information, and setting the filtering parameter to the selected pre-stored filtering parameter value.

2. The GPS filter-setting method of claim 1, wherein terminal information of the user terminal comprises at least one of model information of the user terminal, a type of an operating system (OS) being used by the user terminal, and a version of the OS.

3. The GPS filter-setting method of claim 1, wherein the GPS signal receiving environment information comprises first receiving environment information according to a physical obstacle environment around the user terminal and second receiving environment information according to a weather environment in an area where the user terminal is located.

4. The GPS filter-setting method of claim 1, wherein the filtering parameter comprises a parameter related to a filtering range when the user terminal filters the invalid GPS signal by software.

5. The GPS filter-setting method of claim 1, wherein the setting of the filtering parameter to a selected value comprises:
   when there is no pre-stored filtering parameter value which is mapped to the terminal information of the user terminal and the GPS signal receiving environment information, analyzing a first relationship between pre-stored filtering parameter values and corresponding pre-stored terminal information or a second relationship between the pre-stored filtering parameter values and corresponding pre-stored GPS signal receiving environment information;
   newly generating a new filtering parameter value corresponding to the terminal information of the user terminal and the GPS signal receiving environment information, based on the first relationship or the second relationship; and
   setting the filtering parameter used to filter the invalid GPS signal in the user terminal to the new filtering parameter value.

6. The GPS filter-setting method of claim 1, further comprising:
   adjusting, by the GPS filter-setting server, a setting period of the filtering parameter based on a position change rate of the user terminal.

7. The GPS filter-setting method of claim 1, wherein the setting of the filtering parameter comprises:
   setting the filtering parameter based on the collected terminal information of the user terminal and the GPS signal receiving environment information, and a movement type of the user terminal.

8. A GPS filter-setting server comprising:
   a data collection processor configured to collect terminal information of a user terminal and GPS signal receiving environment information;
   a filtering parameter setter configured to set a filtering parameter used to filter an invalid GPS signal in the user terminal based on the collected terminal information of the user terminal and the GPS signal receiving environment information; and
   a communication interface configured to transmit the set filtering parameter to the user terminal,
   wherein the filtering parameter setter selects a pre-stored filtering parameter value, which is mapped to the terminal information of the user terminal and the GPS signal receiving environment information, and sets the filtering parameter to the selected pre-stored filtering parameter value.

* * * * *